Oct. 28, 1958 H. A. SHERWOOD 2,858,135

SOUND RECORDING AND REPRODUCING APPARATUS

Filed Oct. 25, 1951 6 Sheets-Sheet 1

INVENTOR
Henry A. Sherwood,
BY
Pennie, Edmonds, Morton, Barrows & Taylor
ATTORNEYS

SOUND RECORDING AND REPRODUCING APPARATUS

Filed Oct. 25, 1951 6 Sheets-Sheet 2

INVENTOR
Henry A. Sherwood
BY
Pennie, Edmonds, Morton, Barrows & Taylor
ATTORNEYS

SOUND RECORDING AND REPRODUCING APPARATUS

Filed Oct. 25, 1951 6 Sheets-Sheet 3

INVENTOR
Henry A. Sherwood
BY
Pennie, Edmonds, Morton, Barrows & Taylor
ATTORNEYS Oct. 28, 1958 H. A. SHERWOOD 2,858,135

SOUND RECORDING AND REPRODUCING APPARATUS

Filed Oct. 25, 1951 6 Sheets-Sheet 4

INVENTOR
Henry A. Sherwood
BY
Pennie, Edwards, Morton, Barrows & Taylor
ATTORNEYS Oct. 28, 1958 H. A. SHERWOOD 2,858,135

SOUND RECORDING AND REPRODUCING APPARATUS

Filed Oct. 25, 1951 6 Sheets-Sheet 5

INVENTOR
Henry A. Sherwood
BY
Pennie, Edmonds, Morton, Barrows & Taylor
ATTORNEYS Henry A. Sherwood
INVENTOR BY Pennie, Edmonds, Morton, Barrows & Taylor
ATTORNEYS 2,858,135

SOUND RECORDING AND REPRODUCING APPARATUS

Henry A. Sherwood, Tarrytown, N. Y.

Application October 25, 1951, Serial No. 253,129

22 Claims. (Cl. 274—13)

Figures 1, 2, 3:
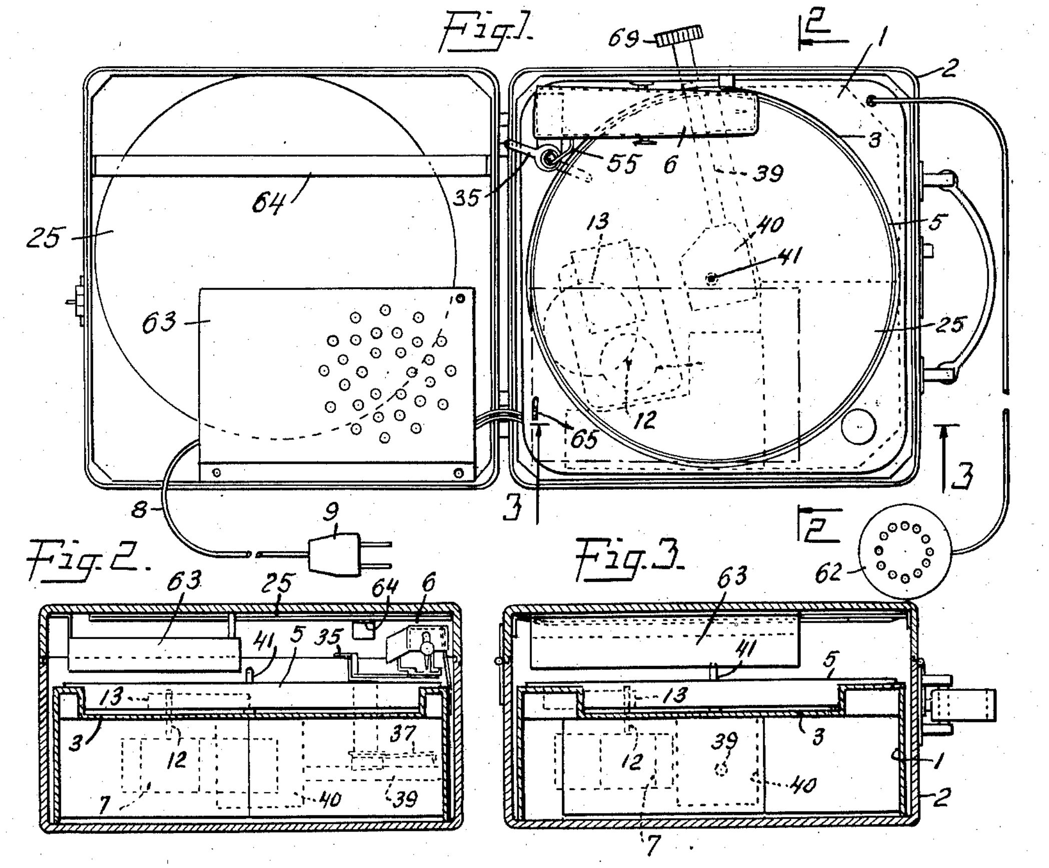

This invention relates to sound recording and reproducing apparatus, and has for its object the provision of certain improvements in such apparatus.

The sound recording and reproducing apparatus of the invention is of the type that uses a single operating arm (herein referred to as a tone arm) carrying a pick-up cartridge and stylus for embossing a record on a thin flexible disc. For convenience, the apparatus is herein referred to as a recorder. The tone arm is positively driven for both recording and reproducing (herein frequently referred to as play-back). The invention aims particularly to provide a portable recorder of small size and inexpensive construction that can be readily used with simple manipulation for either recording or reproducing. To this end, various novel features of construction are embodied in the operative mechanism of the recorder which adapt the mechanism to satisfactorily fulfill the requirements for both recording and reproducing and which enable assembly and housing of the mechanism in a comparatively restricted space.

Briefly, the operative mechanism of the invention comprises a tone arm support pivotally mounted for movement in a horizontal plane. The support mounting is characterized by such a geometrical layout as to permit a rest position within the square circumscribing the largest recording disc and an operating position outside that square. The tone arm is pivotally mounted in its support for movement in a vertical plane. The tone arm carries the pick-up cartridge and stylus (frequently referred to simply as the pick-up) in a mounting that permits spring biased lateral but not vertical motion of the cartridge relative to the tone arm, and means are provided for eliminating and restoring lateral motion of the cartridge relative to the tone arm. The same cartridge and stylus are used for recording and reproducing, and the tone arm has a forced feed (i. e. is positively driven) for both recording and reproducing. An over-center spring arrangement is provided for increasing the pressure of the stylus on the recording disc during recording. A single manually operated control element serves to arrange the operative parts of the mechanism and to connect the electric circuit for either recording or reproducing. The over-center spring arrangement is manually operated to arrange the operative parts for recording, but these parts may be automatically restored to their reproducing positions by lifting the forward end of the tone arm.

The invention further provides a novel and simple means for changing the speed of rotation of the turntable, whereby different speeds may be used for recording and reproducing, a particularly useful feature for recording (e. g. dictating) at a faster speed than playback (e. g. transcribing). The speed changing means further enables the turntable speed to be readily changed to any one of the speeds required for the play-back of the three currently popular types of record.

The operative mechanism of the invention permits operative disengagement of the tone arm and pick-up from its normal positive drive, so that the recorder may be used for the play-back of records in which the pick-up is moved across the record by the recording grooves thereon.

Figure 18:
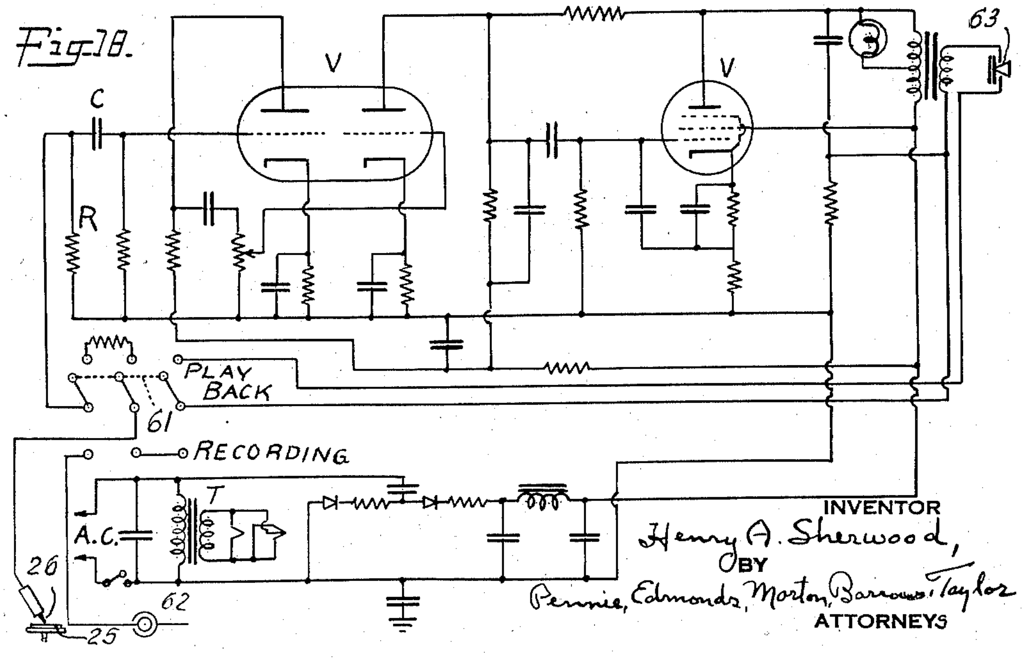
Figure 4:
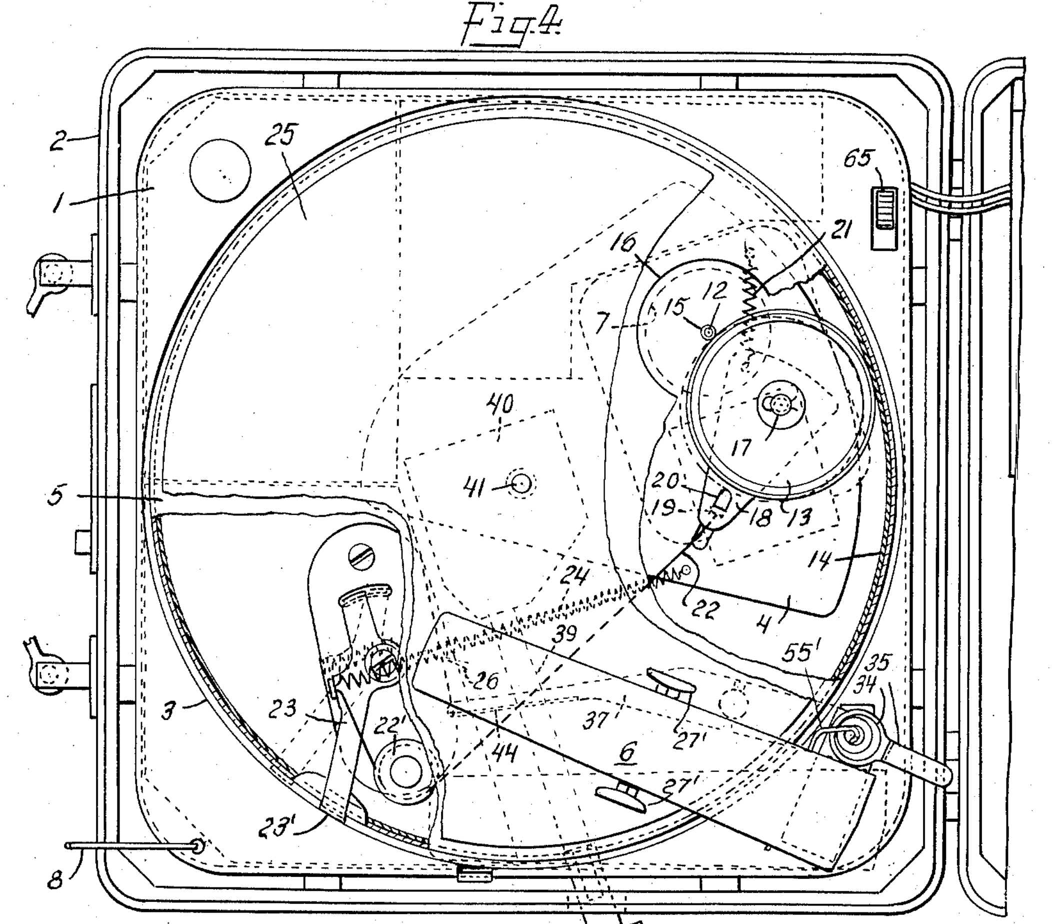
Figure 5:
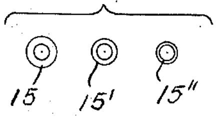
Figures 6, 8:
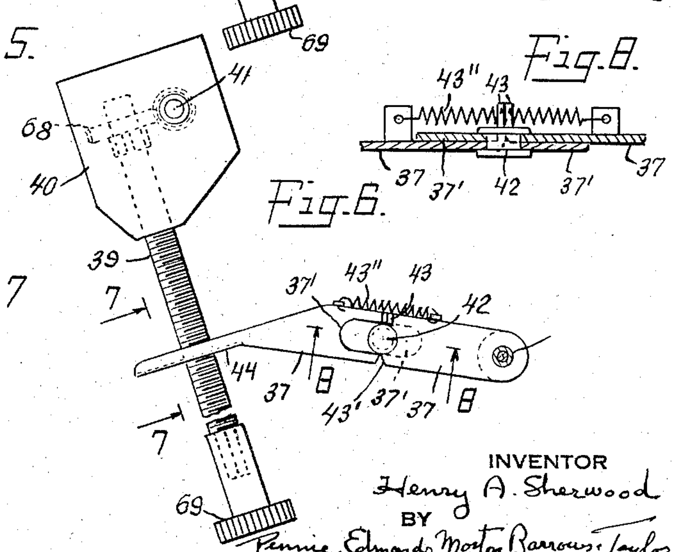
Figure 7:
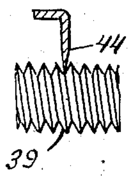
Figures 9, 10, 11:
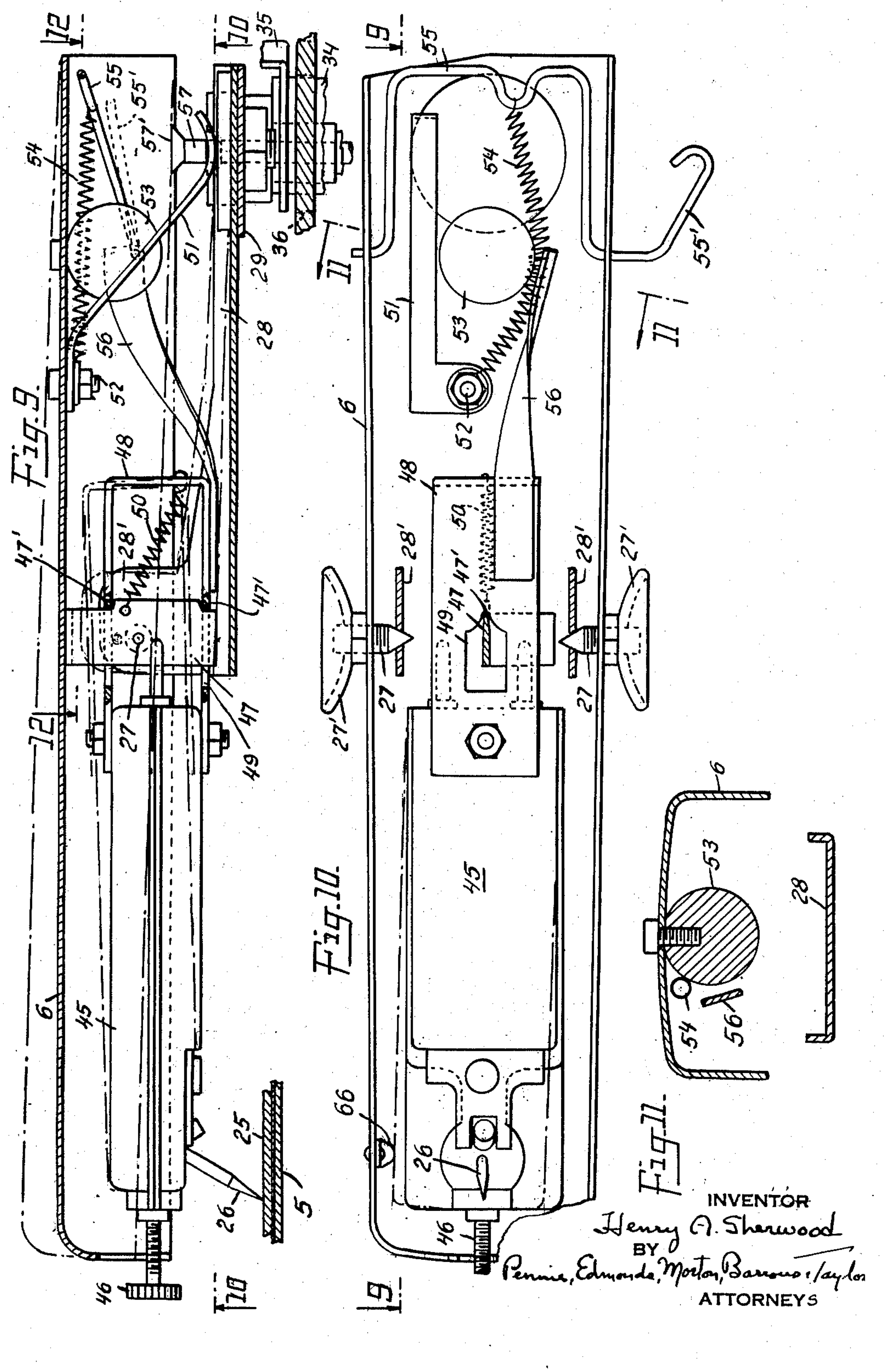
Figures 12, 13:
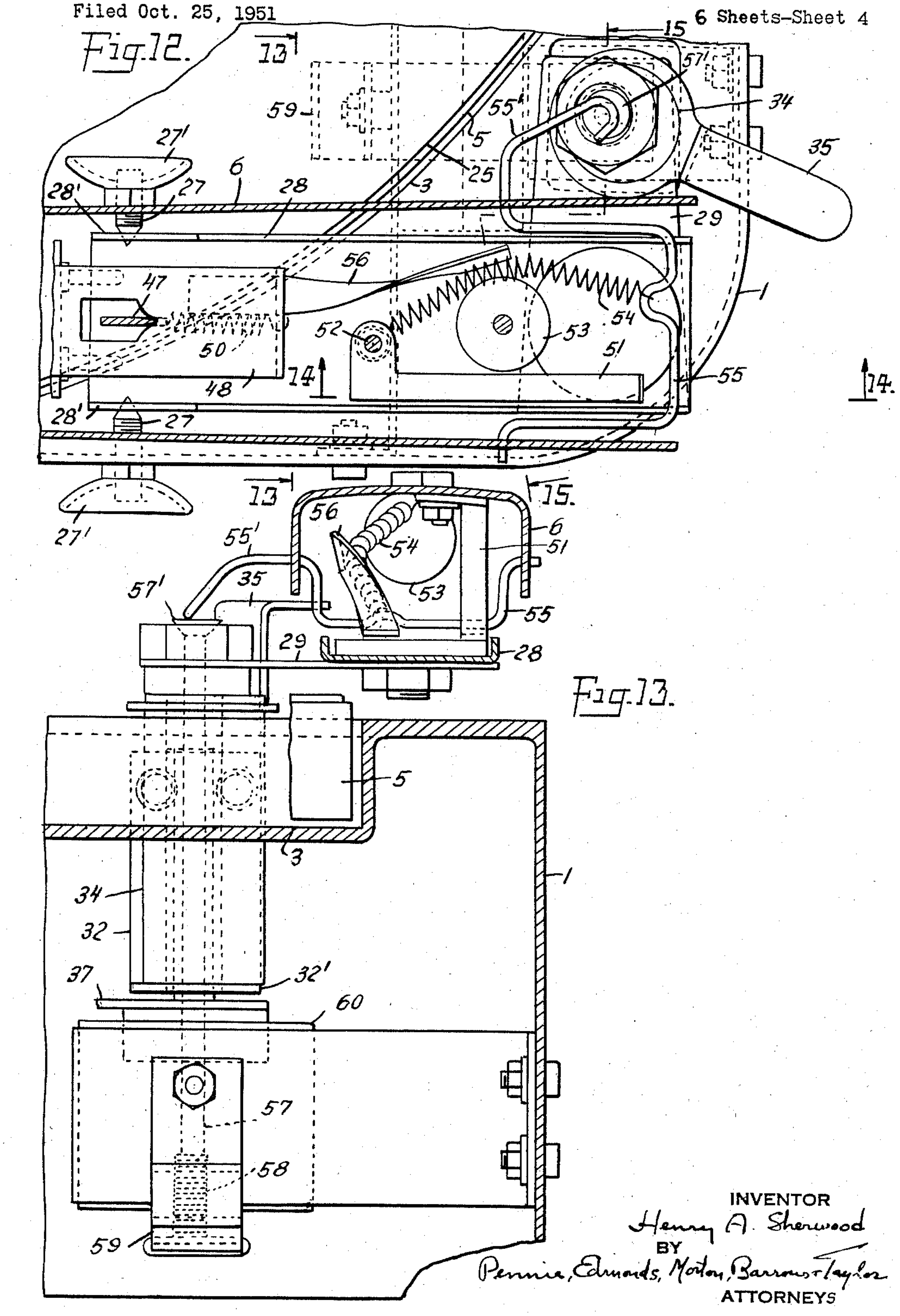
Figures 14, 16:
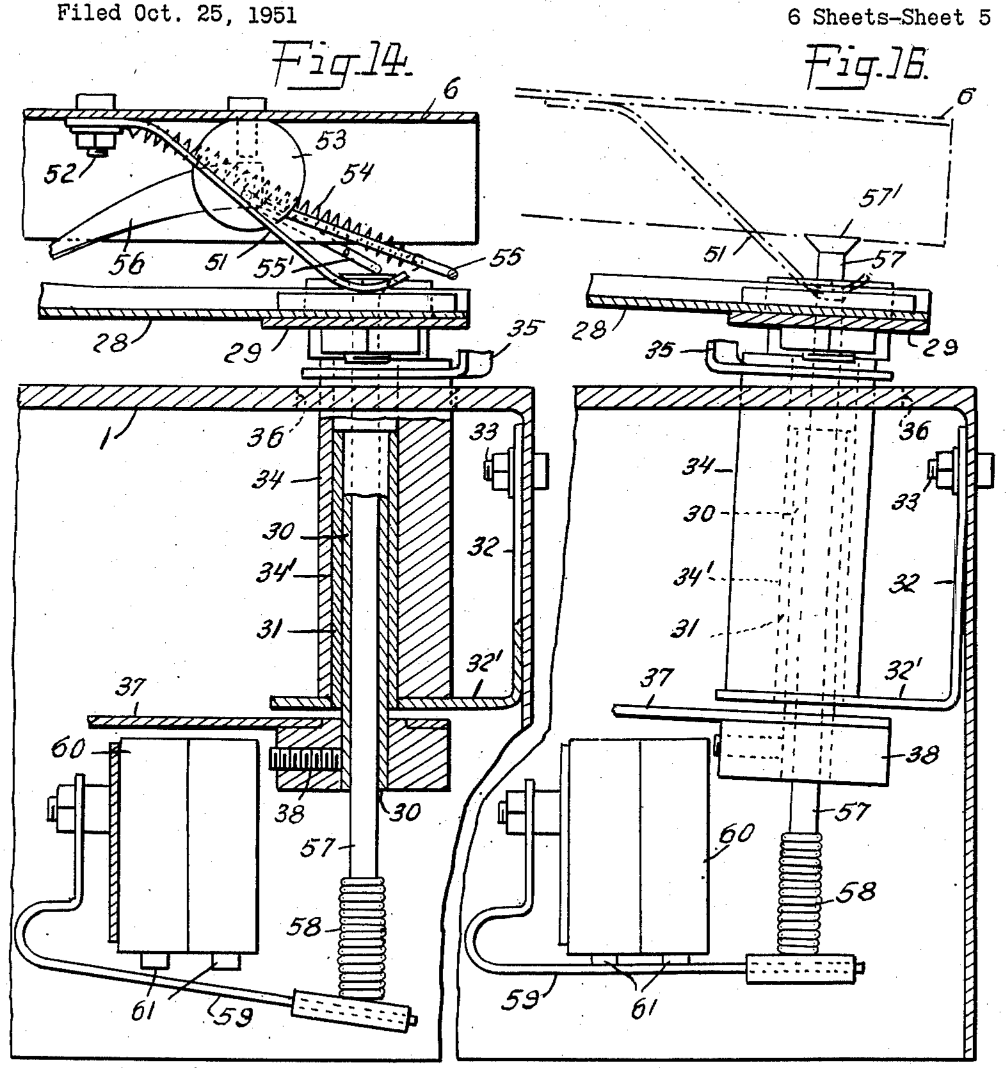
Figures 15, 17:
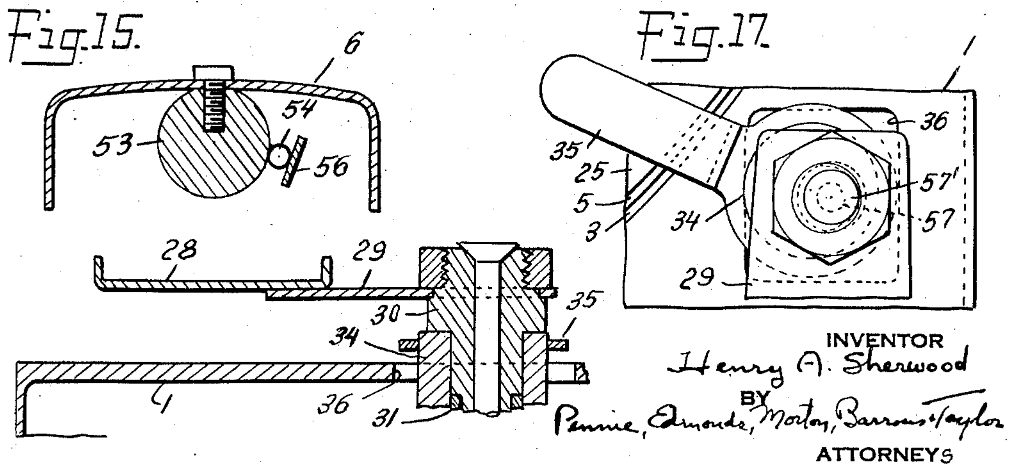
Figures 19, 20:
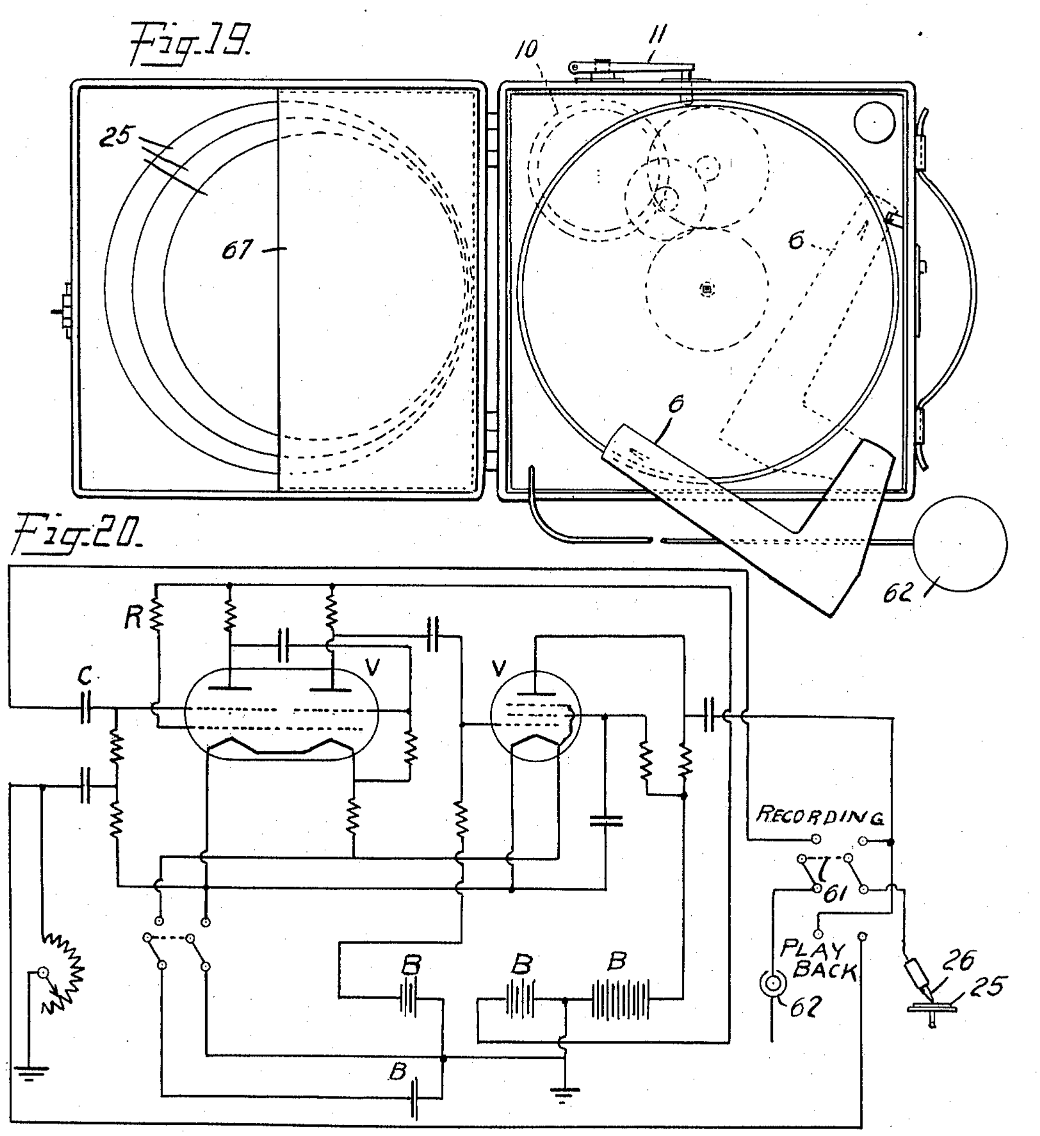

The foregoing and other novel features of the invention will be best understood from the following description taken in conjunction with the accompanying drawings, in which:

Fig. 1 is a top or plan view of an electric motor operated recorder of the invention assembled in a carrying case, with the cover of the case open, Figs. 2 and 3 are sectional elevations of the recorder taken on the section lines 2—2 and 3—3, respectively, of Fig. 1, Fig. 4 is an enlarged top or plan view, with certain parts broken away, of the operative mechanism of the recorder assembled in the carrying case, Fig. 5 is an explanatory view of the speed changing means of the invention, Figs. 6, 7 and 8 are explanatory views of the positive drive for the tone arm, Fig. 9 is a sectional elevation of the tone arm with the operative parts positioned for play-back, Fig. 10 is a sectional plan of the underside of the tone arm taken on the section line 10—10 of Fig. 9, Fig. 11 is a sectional elevation of the tone arm taken on the section line 11—11 of Fig. 10, Fig. 12 is a sectional plan of the rear half of the tone arm and associated supporting means taken on the section line 12—12 of Fig. 9 with the operative parts positioned for recording, Fig. 13 is a sectional elevation of the tone arm and associated supporting means taken on the section line 13—13 of Fig. 12, Fig. 14 is a sectional elevation taken on the section line 14—14 of Fig. 12 showing parts of the tone arm and associated supporting means, Fig. 15 is a sectional elevation taken on the section line 15—15 of Fig. 12, Figs. 16 and 17 are elevation and plan views, respectively, of the tone arm supporting means showing the tone arm disengaged from its positive drive means and with the operative parts positioned for play-back, Fig. 18 is a diagram of the electric circuit of the electric motor operated recorder of Fig. 1, Fig. 19 is a top or plan view of a spring motor operated recorder assembled in a carrying case with its cover open and embodying the same operative mechanism illustrated in the preceding figures, and Fig. 20 is a diagram of the electric circuit of the spring motor operated recorder of Fig. 19.

The recorder of the invention is adapted by simple manipulation to be set for either play-back or recording utilizing the same tone arm, pick-up and other operative parts of the mechanism. In Figs. 9, 10, 11, 16 and 17 the operative parts are shown positioned for play-back. In Figs. 12, 13, 14 and 15 the operative parts are shown positioned for recording. Manipulation of a single manually operated control element (handle 55′) serves to make all of the necessary changes in the operative parts of the mechanism to fulfill the requirements of either play-back or recording. These requirements are:

For play-back:

(1) Application of low pressure on the pick-up stylus, (2) A slight lateral play of the stylus, and (3) Switching the electric circuit for play-back.

For recording:

(1) Application of high pressure on the pick-up stylus, (2) Elimination of lateral play of the stylus, and (3) Switching the electric circuit for recording.

The electric circuit of the recorder is normally connected for play-back, and the normally active parts of the recorder then impart a relatively low play-back pressure to the pick-up stylus while permitting slight lateral play thereof. The single manually operated control element serves to actuate a switch included in the circuit to connect the circuit for recording and substantially simultaneously to operate the means for eliminating lateral play of the stylus and for imparting thereto the relatively higher pressure required for recording. The control element and the other operative parts are automatically reset for play-back by lifting the forward end of the tone arm.

The operative mechanism of the recorder is assembled on a rectangular chassis 1, of molded plastic or the like, which is suitably fitted into a carrying case 2, of leather or the like. The chassis has a circular and slightly recessed transverse partition 3 on the top of which is bolted, or otherwise appropriately secured, a relatively large triangular metal plate 4 to which many of the parts of the mechanism are fastened, both above and below the partition.

The turntable 5 and tone arm 6 may be operated by any suitable motive power, such as an electric motor, spring motor, or the like. In Figs. 1 and 2, the motive power is an electric motor 7, adapted to be connected to a conventional source of electric energy through a cable 8 and plug 9. In Figs. 19 and 20, the motive power is a spring motor 10 adapted to be manually wound by a hinged crack arm 11. Aside from the minor necessary differences in mechanically connecting the two types of motive power to the turntable and tone arm, the novel features of construction that characterize the invention are the same irrespective of the motive power, and will be particularly described by reference to Figs. 4 to 18.

The upwardly extending stud shaft 12 (of the electric motor spindle or shaft) operatively engages the friction surfaced (e. g. rubber-tired) periphery of a flexibly mounted wheel 13. The friction-surfaced periphery of the wheel 13 also engages the depending friction-surfaced flange 14 of the turntable 5. This driving connection between the motor and turntable is known in the art, but I provide novel and simple means for conveniently changing the speed-ratio of the connection to permit rotation of the turntable at different predetermined speeds. The shaft 12 is encircled by a removable sleeve 15 of such interior (inside) nature and dimension that the sleeve operatively engages the shaft and rotates therewith. The exterior (outside) diameter of the sleeve is such that its effective driving circumference imparts to the turntable a predetermined speed of rotation. A plurality (usually three) of such removable sleeves (15, 15′ and 15″, Fig. 5) of different exterior diameters are provided for encircling the shaft 12 and imparting thereto different effective driving circumferences. The sleeves 15 may advantageously be coiled wire springs whose inside diameters are the same as the diameter of the shaft 12, so that any sleeve may be mounted on the shaft. Because of the inherent characteristics of the coiled spring wire, the encircling sleeve makes a firm frictional engagement with the shaft. The sleeves are made of spring wire of selected gauge to give the desired exterior diameters to the different size sleeves. Three removable sleeves 15, 15′ and 15″ are usually provided with outside diameters proportioned to rotate the table at 33⅓, 45 and 78 R. P. M., respectively, which are the respective speeds required for playing three currently popular types of record. The removable sleeves also permit a slower play-back speed than used for dictating or recording.

In accordance with one aspect of the invention, an opening 16, conveniently circular and of about the same diameter as the wheel 13, is cut through the turntable 5 in the same radial arc as the shaft 12, and by moving the turntable until the opening 16 is over (i. e. above) the shaft 12, the removable sleeves 15 may be conveniently changed (by manually pushing the flexibly mounted wheel 13 away from the shaft 12) to vary the speed of rotation of the turntable. The wheel 13 is rotatably mounted on an upstanding pin 17 secured to a small triangular plate 18. The plate 18 has a cut-out depending lug 19 which extends into a slot 20 in the supporting plate 4, whereby the plate 18 is capable of a limited sliding movement over the plate 4 and a slight pivotal movement about the lug 19. A coil spring 21 normally biases the plate 18 so as to hold the wheel 13 (pivoted thereon) in operative frictional engagement with the sleeve 15 (encircling the shaft 12) and with the flange 14. The plate 18 is adapted to be moved (against the tension of the spring 21) by a wire 22 having one end fastened to the plate, so as to disengage the driving connection between the wheel 13 and the turntable. The wire 22 passes around a guide pulley 22′, and its other end is fastened to a bell crank lever 23, having an operating handle 23′ extending upwardly alongside the outer periphery of the turntable and sufficiently thereabove for convenient manual operation. A coil spring 24 holds the lever 23 firmly in each of its two operating positions, i. e. (1) with the wheel 13 engaging the turntable (full lines in Fig. 4) and (2) with the wheel and turntable disengaged (dotted lines in Fig. 4).

Recording is effected by embossing a thin plastic disc record 25, mounted on the turntable 5, with an embossing stylus 26 depending from the pick-up cartridge (45) carried by the tone arm 6 (Figs. 9 and 10). Pivot-pointed bolts 27 are threaded through oppositely-positioned apertures in the side walls of the tone arm 6, about midway of its length. The bolts 27 are secured to their respective side walls by finger-grip nuts 27′. The pivot points of the bolts 27 extend into correspondingly-shaped bearing apertures in oppositely positioned upstanding ears 28′ at the forward end of an arm 28, on which the tone arm is thereby pivotally supported for movement in a vertical plane.

The rear end of the arm 28 is welded or otherwise appropriately secured to one end of a lever 29. The other end of the lever is secured to a vertically positioned tubular shaft 30 rotatably mounted within a stationary journal sleeve 31 (Figs. 14, 15 and 16). The lower end of the sleeve 31 is rigidly fastened ( e. g. welded, soldered or screwed) to the inwardly extending horizontal arm 32′ of an L-shaped bracket 32 of heavy spring metal in the nature of a leaf spring. The vertical arm of the bracket 32 is anchored by a bolt 33 to the side wall of the chassis. The sleeve 31 extends through the eccentrically positioned bore 34′ of a cylindrical journal 34 having an operating handle 35 at its upper end. The eccentrically-bored journal 34 extends through a square opening 36 in one triangular corner of the chassis and its lower end rests loosely on the horizontal arm 32′ of the spring bracket 32. As the journal is given a half turn (by its operating handle 35) from its normal operating position with its eccentric bore 34′ substantially vertical (Fig. 14), it makes a fulcrum engagement with the inner wall of the opening 36 and its eccentric bore 34′ is slightly displaced from the vertical against the tension of the spring bracket 32 and the feed arm 37 is slightly elevated (Fig. 16).

A feed arm 37, for moving the tone arm 6 across the record, is secured by a collar 38 to the lower end of the tone arm support shaft 30. The feed arm 37 is adapted to be driven by a feed screw 39, which in turn is driven by the turntable 5 through a gear reduction train housed in the gear box 40. The turntable 5 fits snugly on the vertical spindle 41 of the gear reduction train and rotation of the turntable is thus transmitted to the spindle 41 and thence through the gear reduction train to the feed screw 39.

In accordance with one aspect of the invention, the feed arm 37 is made in two parts hinged together by a pivot pin 42 (Figs. 6 and 8). The outer part of the feed arm is secured to the collar 38, and the inner part is provided with a knife-edge 44 adapted to engage the threads of the feed-screw 39. Each part of the feed arm 37 has an ear 37′ extending beyond its opening for the pin 42, and the two parts are assembled in overlapping relation (Fig. 8) whereby the ears 37′ hold the two parts longitudinally rigid. Each part has an upturned lug or stop 43 on one side of its pivot opening and a beveled edge 43′ on the opposite side of its pivot opening. Normally, a coil spring 43″ holds the lugs 43 in engagement and the two-part arm 37 is then operatively rigid. However, the two parts of the arm may be turned about the pivot pin 42 (against the tension of the spring 43″) until the beveled edges 43′ engage, thus permitting folding of the two-part arm through a desired angle. Such folding of the arm 37 is desirable if its inner part contacts some fixed part of the mechanism, when the tone arm is manually moved as hereinafter described. Folding of the two-part arm 37 also permits the tone arm to be moved within the confines of a small carrying case (as shown in dotted lines in Fig. 19) when the case is to be closed. In such a small carrying case, the operating position of the tone arm must be outside the confines of the case and the two parts of the feed arm held operatively rigid when the recorder is to be operated.

The mechanism associated with the tone arm 6 embodies several of the novel features of the invention. The tone arm has at its forward end a pick-up cartridge 45 functioning both for recording (record embossing) and play-back. The cartridge contains a piezo-electric crystal the functions and operations of which for recording and play-back purposes are well understood in the art. The stylus 26 is inserted in the cartridge and secured therein by a screw 46.

The cartridge 45 is carried by a depending bracket or post 47 welded or otherwise appropriately secured to the underside of the tone arm. The bracket is centrally positioned between the sides of the tone arm about midway of its length. A yoke 48, having an opening 49 with a notched rear end in each of its opposite sides, is secured to the top and bottom of the cartridge at its rear end. The bracket 47 passes through the openings 49 and the notched ends of the openings bear against spaced knife-edge portions 47′ on the rear edge of the bracket 47. Between its knife-edge bearing portions 47′, the bracket 47 is of enlarged width in order to vertically position the yoke 48 on the bracket. A resilient, self-restoring spring 50 is secured at its forward end to the bracket 47 (just below the upper knife-edge 47′), and the rear end of the spring is secured to the yoke 48 (near the bottom of the rear end thereof). The spring 50 holds the notched ends of the yoke openings 49 firmly against the knife-edge bearing portions 47′ of the bracket. This mounting of the cartridge 45 permits lateral but not vertical motion of the pick-up relative to the tone arm, and the spring 50 biases the pick-up in its mid position, that is, its normal play-back position. Any deviation from this position increases the tension of the spring 50, and the spring thus serves to maintain the pick-up properly positioned for play-back with spring-biased lateral play. Due to its rearward inclination, the spring 50 also prevents vertical movement of the cartridge relative to the tone arm during operation.

A leaf spring 51 is anchored at its forward end by a bolt 52 to the underside of the tone arm 6 about midway between the pivot bolts 27 and the rear end of the arm. The rear curved end of the leaf spring 51 engages the tone arm support 28. The pivot bolts 27 for supporting the tone arm 6 are positioned approximately at the center of gravity of the tone arm, and the leaf spring 51 imparts a permanent vertical pressure to the tone arm and pick-up sufficient for play-back.

A steel ball (or equivalent spherically-surfaced member) 53 is secured to the underside of the tone arm 6 between the bolt 52 and the rear end of the arm. An over-center coil spring 54 is secured at its forward end to the bolt 52 and its other end is secured to the base of a U-shaped control element 55 (of stiff wire or the like) pivotally mounted in the opposite sides of the tone arm 6 and having an operating handle 55′ extending outwardly beyond the side of the tone arm. The leaf spring 51 and the coil spring 54 are positioned on opposite sides of the ball 53. A leaf spring 56 is secured by welding or the like to the underside of the yoke 48 and extends rearwardly to a position adjacent that side of the ball 53 on which the coil spring 54 is positioned. The leaf spring 56 is twisted through an angle of about 90° so that its flat portion adjacent the ball 53 lies in a plane slightly inclined away from the vertical axis of the ball (Figs. 11 and 15).

A switch-actuating rod 57 is positioned within the tubular bore of the shaft 30 (operatively connected to the tone arm). The upper end of the rod 57 has a flared head 57′, and the lower end of the rod is inserted partway into a tightly coiled spring 58. By turning the spring 58 on the rod 57 the operative length of the switch-actuating rod 57 is easily and accurately adjusted. The spring 58 (i. e. the effective lower end of the rod 57) normally rests on the free (rubber covered) end of a spring element 59, whose other end is secured to a switch box 60 having two spring contacts 61 which the element 59 is adapted to operate. Normally, the contacts 61 are pressed inwardly by the spring element 59 (Fig. 16), and then make electric circuit connections (within the box 60) for play-back. When the switch actuating rod 57 is pressed down, it forces the spring element 59 out of engagement with the contacts 61 (Fig. 14), and the contacts 61 are then pressed outwardly by their cooperating springs and make electric circuit connections (within the box 60) for recording.

While the electric circuits in themselves form no part of the present invention, Figs. 18 and 20 illustrate suitable circuit diagrams for the recorders of Figs. 1 and 19, respectively, in order to show the manner in which various parts of the recorders (e. g. stylus 26, record 25, spring contacts 61, microphone 62 etc.) are included in the circuits. In the diagrams, conventional electrical symbols indicate resistances R, condensers C, vacuum tubes V, transformers T, and batteries B. The same parts are indicated by the same reference characters, although the parts are diagrammatically illustrated in Figs. 18 and 20. As is well understood in the art, the piezo electric crystal in the cartridge 45 is electrically included in the circuit so that modulations impressed on the crystal are translated into sound for play-back and into vibrations of the stylus 26 for recording. The instrumentalities of the electric circuit are conveniently assembled and secured within the chassis 1, below the partition 3. In the recorder of Figs. 1 and 2, having an electric motor as the motive power, a loudspeaker 63 may advantageously be included in the electric circuit and may conveniently be assembled in the cover of the carrying case 2. The cover also affords accommodation for extra disc records 25 held in place (behind the loudspeaker) by an elastic strap 64. A switch 65 connects the electric circuit of the recorder of Figs. 1 and 2 to the A. C. source of electric energy (through the cable-plug 8–9). With the spring motor operated recorder of Fig. 19, the electric energy is supplied by batteries B. The microphone 62 serves for both recording and playback. In this recorder, a pocket 67 in the cover of the carrying case serves to accommodate records 25 of various size.

The operation of the mechanism is as follows: The mounting of the tone arm 6 permits (1) motion of the arm in a horizontal plane (to sweep across the turntable) about the longitudinal axis of the bearing sleeve 31 as the pivot point, and (2) vertical motion of the arm about the pivot bolts 27. The pick-up cartridge 45 is mounted to allow lateral play within the tone arm, with the spring 50 tending to hold the cartridge midway between the sides of the tone arm.

For playback, the cartridge 45 has spring-biased lateral play, and the pressure of the stylus 26 on the record 25 is that supplied by the leaf spring 51. The handle 55' of the control element is in its elevated position (Figs. 9 and 10), and the switch-actuating rod 57 is likewise elevated (Figs. 9 and 16), so that the spring element 59 is free to engage and press inwardly the spring contacts 61, thus connecting the electric circuit for play-back (Figs. 18 and 20). The over-center spring 54 is in its raised position, above the twisted leaf spring 56, both elements being then inactive. Thus, the normally active parts of the mechanism are now positioned to fulfill the requirements for play-back, i. e. (1) application of low pressure on the pick-up stylus, (2) slight lateral play of the stylus, and (3) electric circuit connections for play-back. With the lever 23 turned to its operating position (full lines in Fig. 4) the turntable is rotated by the wheel 13 at a speed determined by the particular spring sleeve 15 encircling the shaft 12 of the electric motor. The tone arm 6 is moved across the record by the feed screw 39 whose threads are engaged by the knife-edge 44. The modulations of the embossed record are translated into sound emitted from the loudspeaker 63 (Fig. 1, 2, 3 and 18), or the microphone 62 of Figs. 19 and 20.

The tone arm 6 may be moved freely across the record 25 by upwardly lifting the arm by the finger grips of the nuts 27'. As the tone arm is thus lifted its support arm 28 is slightly tilted, the tubular shaft 30 (to which the arm 28 is secured) is correspondingly tilted and the arm 37 (secured to the lower end of the shaft 30) is sufficiently elevated to disengage the knife-edge 44 from the feed screw 39. By releasing the grips 27', the spring bracket 32 restores the operative connection between the knife-edge 44 and the feed screw 39, and at the same time the tone arm and pick-up cartridge are returned to their operative position with respect to the record on the turntable.

When it is desirable to permanently disengage the knife-edge 44 from the feed screw 39, as for example where the pick-up is operatively moved across the record by recording grooves thereon, the eccentrically-bored journal 34 is given a half turn by the handle 35 (i. e. from its position in Figs. 12, 13 and 14 to its position in Figs. 16 and 17), and the engagement of the journal with the wall of the opening 36 overcomes the normal tension of the spring bracket 32 and tilts the eccentric bore 34' and hence the shaft 30 just enough to raise the knife-edge 44 out of engagement with the threads of the feed screw 39 (Figs. 16 and 17).

For recording, the handle 55' of the control element is pressed downwardly, and carries the over-center spring 54 down around the spherical surface of the ball 53 to a position between the ball and the twisted spring 56 (Fig. 15). At the same time, the end of the handle 55' engages the flared head 57' of the switch actuating rod 57 and forces the rod down, against the tension of the spring element 59, until the spring element is forced away from the spring contacts 61. The contacts 61 thereupon connect the electric circuit for recording (Figs. 18 and 20), thus fulfilling the third requirement for recording.

The over-center spring 54 holds the handle 55' firmly in its lower operating position. In this position of the handle 55', the spring 54 (secured between the handle 55' and the bolt 52) is tensioned around the ball 53, and this spring tension is added to the spring pressure of the leaf spring 51 to impart to the stylus 26 the high pressure required for recording, thus fulfilling the first requirement for recording. The spring 54 (now positioned between the ball 53 and twisted spring 56) also sufficiently tensions the spring 56 so that it swings the pick-up cartridge 45 (against the tension of the spring 50) into the dotted-line position shown in Fig. 10, where the cartridge engages a stop 66 on the side wall of the tone arm. The side of the tone arm against which the cartridge is thus forced by the spring 56 is on the outside of the recording disc. As the tone arm is now fed toward the center of the disc (in recording), no lateral play can exist between the cartridge and the tone arm, thus fulfilling the second requirement for recording.

The action of the over-center spring 54 and the ball 53 is important in the recorder of the invention. The spherical surface of the ball amplifies the motion of the over-center spring 54 within the limited available space. There is not sufficient available space to adequately tension the spring 54 by a straight line motion. But by pulling the spring 54 over a spherical surface, the available straight line motion is amplified to such an extent that adequate tension is developed in the spring 54 for imparting to the stylus the necessary high pressure for recording.

The over-center spring 54 must be manually pushed down over the spherical surface of the ball 53 by the control element 55. However, the spring 54 may be automatically reset to its play-back position by lifting the forward end of the tone arm. If, when changing from recording to play-back, the front end of the tone arm is lifted, the rear end of the arm will be lowered with respect to its support 28, and the upper end of the spring 54 (attached at 52 to the tone arm) and the ball 53 will be correspondingly lowered until the tension of the spring pulls the control element 55 back to its play-back position. When the tone arm is lifted by the finger grips 27', the tone arm support 28 is tilted and the knife-edge 44 is disengaged from the feed screw 39, as hereinbefore described. The tubular shaft 30 then turns freely within its relatively fixed journal sleeve 31, and the tone arm and pick-up can be positioned at any place on the record.

The feed screw 39 is of the multiple thread type, usually double or triple threaded, for greater convenience in positioning the knife-edge 44 thereon and for groove-back spacing. As shown in Fig. 6, the feed screw 39 is operatively connected to the gear reduction train in the gear box 40 through a slip or friction clutch 68. A knurled thumb knob or wheel 69 is removably secured to the outer or free end of the feed screw. The free end of the feed screw extends to an opening in the carrying case, through which opening the knob may be attached to the screw, so that the knob may be detached and placed in the case when the latter is closed. The slip clutch connection of the feed screw to the gear reduction train permits the feed screw to be manually rotated (by the knob 69) with respect to the gear reduction train, and such manual rotation of the feed screw will drive the knife-edge 44 (and hence the tone arm and pick-up) in one direction or the other, depending upon the direction of rotation of the knob 69. Thus, by manually turning the knob 69, the tone arm and pick-up can be rapidly back-spaced, even while the turntable is rotating. The multiple thread of the feed screw amplifies the extent of back-spacing for each revolution of the screw. The pick-up readily slides across the embossed record, when manually moved by the knob 69, without injury to the record.

The operative mechanism of the recorder is made up of inexpensive parts so compactly assembled that the mechanism can be carried in a comparatively small case. For example, the carrying case of the spring motor recorder of Fig. 19 is 6½ inches square by 3½ deep, and the entire recorder weighs only about 7 pounds. The electric motor recorder of Figs. 1, 2 and 3 is housed in a carrying case 9½ inches square by 5½ inches deep, and weighs only slightly more. The only controls required are a conventional "on-off" motor switch, the "on-off" turntable lever (23') the single manually operated control element (55), and a volume control if desired.

In a portable recroder of comparatively small size, the circumscribing square of the largest disc record determines the maximum size of the operating mechanism. Since the movement of the pick-up should be generally tangential with respect to the disc, the operating position of the tone arm may be outside the circumscribing square. This is the case in the recorder of Fig. 19, where the operating position of the tone arm (shown in full lines) is outside the circumscribing square of the largest disc record that can be used. In the recorder of the invention, such an operating position of the tone arm (outside the circumscribing square and with the pick-up substantially tangential to the disc) is realized by increasing the effective operating length of the tone arm through the provision of the lever 29, with its longitudinal axis at a right angle to the longitudinal axis of the tone arm support 28. The rest position of the tone arm is shown in dotted lines in Fig. 19, and is wholly within the circumscribing square. In moving the tone arm from its operating position to its rest position, the tubular shaft 30 will correspondingly move the feed arm 37, and the inner part of the arm will contact the gear box 40 (or other stationary part of the mechanism), and the two part arm will fold to the extent necessary to permit further movement of the tone arm to its rest position.

I claim:

1. In a sound recording and reproducing apparatus characterized by the provision of a single pick-up with depending stylus and a forced feed thereof for both recording and reproducing, means for imparting a relatively low reproducing pressure to said pick-up while permitting slight lateral, horizontal play thereof, a resilient self-restoring spring for biasing said pick-up laterally toward a mid position but being yieldable for enabling slight lateral play of said pick-up in opposite directions, means for eliminating lateral play of the pick-up, including means for shifting said pick-up laterally horizontally against the action of said spring and means operable conjointly with said last-named means for substantially simultaneously imparting an increased pressure to said pick-up for recording.

2. In a sound recording and reproducing apparatus characterized by the provision of a single pick-up and a forced feed thereof for both recording and reproducing, a rotatably mounted turntable, a tone arm adapted to be moved across the turntable and on which the pick-up is mounted for spring-biased lateral play, means for imparting a relatively low reproducing pressure to said pick-up, a spherically-surfaced member secured to said tone arm, and an over-center coil spring operatively connected to the tone arm and adapted to be tensioned around the spherical surface of said member for imparting an increased pressure to the pick-up for recording.

3. In a sound recorder having an electric circuit adapted to be connected for play-back or recording, the combination with a rotatably mounted turntable of a motor-driven shaft, a tone arm adapted to be moved across the turntable, a pick-up having a stylus carried by said tone arm, means for imparting a relatively low play-back pressure to the stylus while permitting slight lateral play thereof parallel to said turntable, a control element adapted to be moved between play-back and recording positions, an over-centering spring for holding said control element selectively in either of its said positions and for imparting increased pressure to said stylus when said control element is in its recording position, and means actuated by said control element when moved to its recording position for connecting said electric circuit for recording and substantially simultaneously eliminating lateral play of the stylus.

4. In a sound recorder having an electric circuit adapted to be connected for play-back or recording, the combination with a rotatably mounted turntable of a tone arm adapted to be moved across the turntable, a pick-up cartridge and depending stylus carried by said tone arm, means for imparting a relatively low play-back pressure to the stylus while permitting slight lateral horizontal play thereof, means for biasing said pick-up cartridge and stylus laterally with respect to said tone arm toward a mid position but being yieldable for enabling said slight lateral play of said pick-up cartridge and stylus in opposite directions, and means actuated by a single manually-operated control element for connecting said electric circuit for recording and substantially simultaneously shifting said cartridge laterally horizontally against the tone arm to eliminate lateral play of the stylus, and for substantially simultaneously imparting increased pressure to the stylus.

5. In a sound recorder having an electric circuit adapted to be connected for play-back or recording, the combination with a rotatably mounted turntable and a motor drive therefor, of a tone arm pivotally mounted in a support adapted to move the tone arm across the turntable, a pick-up cartridge and depending stylus carried by said tone arm, a control element adapted to be moved between play-back and recording positions, means for imparting a relatively low play-back pressure to the stylus while permitting slight lateral horizontal play thereof, means for biasing said pick-up cartridge and stylus laterally with respect to said tone arm toward a mid position but being yieldable for enabling said slight lateral play of said pick-up cartridge and stylus in opposite directions, means actuated by said control element when moved to its recording position for connecting said electric circuit for recording, and means for substantially simultaneously shifting said cartridge laterally horizontally against the tone arm to eliminate lateral play of the stylus, and for substantially simultaneously imparting increased pressure to the stylus.

6. In a sound recorder according to claim 5, in which the means for permitting slight lateral play of the stylus parallel to the turntable comprises a bracket depending from the underside of the tone arm and having vertically extending and aligned knife-edge portions, a yoke secured to the cartridge and having notched-end openings therein through which said bracket extends, and a spring for holding the notched ends of said openings in engagement with the knife-edge portions of said bracket.

7. In a sound recorder according to claim 6, in which the means for imparting a relatively low play-back pressure to the stylus comprises a spring separate from said biasing means operatively engaging said tone arm and its support.

8. In a sound recorder according to claim 5, in which the means for imparting increased pressure to the stylus comprises a spherically-surfaced member secured to the tone arm, and an over-center coil spring mounted between the tone arm and said control element and adapted to be tensioned around the spherical surface of said member when the control element is moved to its recording position.

9. In a sound recorder according to claim 8, in which the means for eliminating lateral play of the stylus is a leaf spring operatively secured at one end to said cartridge and having its other free end alongside said spherical surface in a position to be tensioned when said over-center spring is tensioned.

10. In a sound recorder having an electric circuit adapted to be connected for play-back or recording, the combination with a rotatably mounted turntable of a tone arm adapted to be moved across the turntable, a pick-up cartridge and stylus, a bracket depending from the underside of said tone arm about midway of its length and having spaced knife-edge portions, a yoke secured to the cartridge and having notched-end openings therein through which said bracket extends, a spring holding the notched ends of said openings in engagement with the knife-edge portions of said bracket, means engaging the tone arm for effecting a relatively low play-back pressure between said stylus and the turntable, a control element adapted to be moved between play-back and recording positions, means actuated by said control element when moved to its recording position for imparting increased pressure to said stylus, means whereby said electric circuit is connected for recording when said control element is moved to its recording position, a spring secured to said yoke and adapted when tensioned to eliminate lateral play of said stylus, and means for shifting the cartridge laterally with respect to the tone arm whereby said spring is tensioned when the control element is moved to its recording position.

11. In a sound recorder having an electric circuit adapted to be connected for play-back or recording, the combination with a rotatably mounted turntable of a tone an arm adapted to be moved across the turntable, a pick-up cartridge and stylus, a bracket depending from the underside of said tone arm about midway of its length and having spaced knife-edge portions, a yoke secured to the cartridge and having notched-end openings therein through which said bracket extends, a spring holding the notched ends of said openings in engagement with the knife-edge portions of said bracket, means engaging the tone arm for effecting a relatively low play-back pressure between said stylus and the turntable, a control element adapted to be moved between play-back and recording positions, means actuated by said control element when moved to its recording position for imparting increased pressure to said stylus, means whereby said electric circuit is connected for recording when said control element is moved to its recording position, said means for imparting increased ressure to the stylus comprising a spherically-surfaced member secured to said tone arm; and an over-center coil spring mounted between the tone arm and said control element and adapted to be tensioned around the spherical surface of said member when the control element is moved to its recording position.

12. In a sound recorder according to claim 11, a leaf spring secured at one end to said yoke and having its other free end alongside said spherical surface in a position to be tensioned when said over-center spring is tensioned and adapted when so tensioned to eliminate lateral play of said stylus.

13. In a sound recorder having an electric circuit including a switch adapted to connect the circuit for play-back or recording, the combination with a rotatably mounted turntable of motive means therefor, a tone arm pivotally mounted in a support, a pick-up cartridge and stylus carried by said tone arm, a spring operatively engaging the tone arm and its support for imparting a relatively low play-back pressure to said stylus, a control element pivotally carried by the tone arm and adapted to be moved from its normal play-back position to its recording position, a spherically-surfaced member secured to said tone arm, an over-center coil spring mounted between the tone arm and said control element and adapted to be tensioned around the spherical surface of said member when the control element is moved to its recording position, means including an arm juxtaposed to the spherically-surfaced member and engageable by said over-center spring when the latter passes along said spherical surface, for eliminating lateral play of the stylus; a feed screw for said tone arm operatively connected to said motive means, means operatively connecting said tone arm to said feed screw, and means engaged by said control element when moved to its recording position for operating said switch to connect said electric circuit for recording.

14. In a sound recorder according to claim 13, in which the said arm comprises means mounting said pick-up cartridge and stylus on said tone arm for permitting lateral play of said cartridge and stylus, a leaf spring operatively secured at one end to said cartridge and having its other free end alongside said spherical surface in a position to be tensioned when said over-center spring is tensioned and adapted when so tensioned to eliminate lateral play of said stylus.

15. In a sound recorder having an electric circuit including a switch adapted to connect the circuit for play-back or recording, the combination with a rotatably mounted turntable and a motor drive therefor, of a tone arm adapted to be moved across the turntable, a pick-up cartridge and stylus carried by said tone arm, a depending tubular shaft, means operatively connecting said tone arm to said tubular shaft, a feed screw operatively connected to said motor drive, means operatively connecting said tubular shaft to said feed screw, a control element adapted to be moved between play-back and recording positions, and a rod extending through and being longitudinally movable in said tubular shaft and adapted to be engaged by said control element when moved to its recording position and when so engaged to be moved longitudinally to actuate said switch to connect said electric circuit for recording.

16. In a sound recorder according to claim 15, in which the means operatively connecting the tubular shaft to the feed screw comprises a feed arm having two parts hinged together, and means including a spring and cooperating stops respectively on said two parts of said feed arm for holding the two parts of the feed arm operatively rigid, against relative turning in one direction about their hinge, said spring being yieldable to enable the two parts of the feed arm to be turned about their hinge relatively in the opposite direction for folding the two parts of said feed arm to occupy a relatively small space.

17. In a sound recorder having an electric circuit including a switch adapted to connect the circuit for play-back or recording, the combination with a rotatably mounted turntable of motive means operatively connected to the turntable, a tone arm pivotally mounted in a support, a control element pivotally carried by the tone arm and adapted to be moved from its normal play-back position to its recording position, a depending tubular shaft, a lever having one end secured to said tone arm support and its other end secured to said tubular shaft, a feed screw for said tone arm operatively connected to said motive means, means operatively connecting said tubular shaft to said feed screw, a spring element normally biasing said switch to connect said electric circuit for play-back, and a rod extending through and being longitudinally movable in said tubular shaft and adapted to be engaged by said control element when moved to its recording position and when so engaged to be moved longitudinally to actuate said spring element to render it ineffective for biasing said switch and for thereby effecting operation of said switch to connect said electric circuit for recording.

18. In a sound recorder having an electric circuit including a switch adapted to connect the circuit for play-back or recording, the combination with a rotatably mounted turntable of motive means operatively connected to the turntable, a tone arm pivotally mounted in a support, a pick-up cartridge and depending stylus, a bracket depending from the underside of said tone arm about midway of its length and having spaced knife-edge portions, a yoke secured to the cartridge and having notched-end openings therein through which said bracket extends, a spring for holding the notched ends of said openings in engagement with the knife-edge portions of said bracket, a spring operatively engaging said tone arm and its support for imparting a relatively low play-back pressure to said stylus, a spherically-surfaced member secured to the underside of the tone arm rearwardly of said bracket, a control element pivotally carried by the tone arm and adapted to be moved from its normal play-back position to its recording position, an over-center coil spring mounted between the tone arm and said control element and adapted to be stretched around the spherical surface of said member when the control element is moved to its recording position, a depending tubular shaft operatively connected to said tone arm support, a feed screw for said tone arm operatively connected to said motive means, means operatively connecting said tubular shaft to said feed screw, a spring element normally biasing said switch to connect said electric circuit for play-back, and a rod extending through said tubular shaft and adapted to be engaged by said control element when moved to its recording position and when so engaged to actuate said spring element to render it ineffective for biasing said switch and for thereby effecting operation of said switch to connect said electric circuit for recording.

19. In a sound recorder having an electric circuit including a switch adapted to connect the circuit for play-back or recording, the combination with a rotatably mounted turntable of motive means operatively connected to the turntable, a tone arm pivotally mounted in a support, a pick-up cartridge and depending stylus, a bracket depending from the underside of said tone arm about midway of its length and having spaced knife-edge portions, a yoke secured to the cartridge and having notched-end openings therein through which said bracket extends, a spring for holding the notched ends of said openings in engagement with the knife-edge portions of said bracket, a spring operatively engaging said tone arm and its support for imparting a relatively low play-back pressure to said stylus, a spherically-surfaced member secured to the underside of the tone arm rearwardly of said bracket, a control element pivotally carried by the tone arm and adapted to be moved from its normal play-back position to its recording position, an over-center coil spring mounted between the tone arm and said control element and adapted to be stretched around the spherical surface of said member when the control element is moved to its recording position, a depending tubular shaft, a lever having one end secured to said tone arm support and its other end secured to said tubular shaft, a feed screw for said tone arm operatively connected to said motive means, means operatively connecting said tubular shaft to said feed screw, a tubular sleeve within which said tubular shaft is mounted, a spring bracket secured to said sleeve and biased to hold the sleeve and shaft in their normal operating positions with said tubular shaft operatively connected to said feed screw, a journal having an eccentric bore within which said sleeve is mounted, means for turning said journal and thereby disengaging the operative connection of said tubular shaft to said feed screw, a spring element normally biasing said switch to connect said electric circuit for play-back, and a rod extending through said tubular shaft and adapted to be engaged by said control element when moved to its recording position and when so engaged to actuate said spring element to render it ineffective for biasing said switch and for thereby effecting operation of said switch to connect said electric circuit for recording.

20. In a sound recording and reproducing apparatus, the combination of a rotatably mounted record support, a tone arm mounted for movement in one direction to traverse a record on said support and for movement in another direction, a pick-up carried by said tone arm, a stylus on said pick-up, means for imparting a relatively low play-back pressure to said stylus while permitting slight lateral play thereof, a control element mounted to move between play-back and recording positions, means for holding said control element selectively in either of its positions, means actuated by said control element when moved to its recording position for substantially simultaneously eliminating lateral play of the stylus and imparting increased pressure to said stylus, and means responsive to movement of said tone arm in said other direction for automatically moving said control element to play-back position.

21. Apparatus as set forth in claim 20 in which the tone arm is pivoted for enabling said stylus to be disengaged from the record and in which stylus-disengaging pivotal movement of said tone arm automatically moves said control element to play-back position.

22. In a sound recording apparatus, a tone arm; a pick-up having a depending stylus; means mounting the pick-up on the tone arm for horizontal movement with respect thereto laterally of the stylus; spring means for yieldably holding the pick-up in a predetermined horizontal position on the tone arm; cooperable side abutment means on the pick-up and tone arm, normally held separated by said spring means; and manually operable means for shifting the pick-up on the tone arm horizontally and laterally of the stylus against the action of said spring means to cause engagement of the said abutment means whereby the pick-up and tone arm are held against relative movement, thereby to enable the arm and pick-up to function as a unitary device.

References Cited in the file of this patent

UNITED STATES PATENTS

| | | |
|---|---|---|
| 1,809,901 | Jones | June 16, 1931 |
| 1,930,544 | Victor | Oct. 17, 1933 |
| 2,061,224 | Democratis | Nov. 17, 1936 |
| 2,254,412 | Badmaieff | Sept. 2, 1941 |
| 2,262,732 | Gruber | Nov. 11, 1941 |
| 2,332,784 | De Sart | Oct. 26, 1943 |
| 2,340,658 | Goldman | Feb. 1, 1944 |
| 2,351,948 | Gay | June 20, 1944 |
| 2,357,033 | Thompson | Aug. 29, 1944 |
| 2,375,658 | Johnson | May 8, 1945 |
| 2,455,466 | Brubaker | Dec. 7, 1948 |
| 2,478,234 | Cain | Aug. 9, 1949 |
| 2,566,091 | Masterson | Aug. 28, 1951 |
| 2,579,175 | Dale | Dec. 18, 1951 |
| 2,606,766 | Kuhlik | Aug. 12, 1952 |
| 2,613,938 | Bossmeyer | Oct. 14, 1952 |